United States Patent [19]

Rudolph

[11] Patent Number: 4,890,267

[45] Date of Patent: Dec. 26, 1989

[54] SWITCH MATRIX

[75] Inventor: Arno Rudolph, Weil der Stadt, Fed. Rep. of Germany

[73] Assignee: Hewlett-Packard Company, Palo Alto, Calif.

[21] Appl. No.: 910,697

[22] Filed: Sep. 23, 1986

[30] Foreign Application Priority Data

Sep. 24, 1985 [DE] Fed. Rep. of Germany ..... 85112072

[51] Int. Cl.[4] .............................................. G01S 15/06

[52] U.S. Cl. .................................... 367/103; 367/105; 128/661.01

[58] Field of Search ................ 367/103, 105; 128/660, 128/660.05, 660.08, 661.01; 73/626

[56] References Cited

U.S. PATENT DOCUMENTS

| | | | |
|---|---|---|---|
| 3,846,745 | 11/1974 | Hill et al. . | |
| 3,919,683 | 11/1975 | Itamura et al. | 367/105 |
| 4,045,766 | 8/1977 | Iida et al. | 367/105 |
| 4,215,584 | 8/1980 | Kuroda et al. | 73/627 |
| 4,462,092 | 7/1984 | Kawabuchi et al. | 367/105 |
| 4,470,308 | 9/1984 | Hayahawa et al. | 128/661.01 X |
| 4,505,156 | 3/1985 | Questo | 73/626 |
| 4,550,606 | 11/1985 | Drost | 73/626 |
| 4,628,738 | 12/1986 | Burckhardt et al. | 73/626 |

OTHER PUBLICATIONS

"Digital Logic and Computer Design"; Prentice-Hall Inc; Morris Mano; pp. 263-264, 1979.

*Primary Examiner*—Thomas H. Tarcza
*Assistant Examiner*—Tod Swann
*Attorney, Agent, or Firm*—Donald N. Timbie

[57] ABSTRACT

A switch matrix for a transceiver of ultrasonic waves containing a configuration of electroacoustic transducer elements in which in succession proceeding over the arrangement a group of transducer elements can be activated, contains a number of inputs (K1, K2, K3, K4), the number corresponding to the number of transducer elements of a group which are each connected to one of the activated transducer elements, an equal number of outputs (R1, R2, R3, R4) connected to delay elements and a large number of switches T11, T12, . . . , T44) to establish each of the connections required for electronic focusing between the inputs and the outputs. Each input line (K1) is connected to a number of switches (T11, T12, T13, T14), this number corresponding to the number of transducer elements of a group. The switches of the switch matrix are activated through a control circuit (50) over a number of control lines (L1, L2, L3, L4), this number corresponding to the number of transducer elements of a group. Each of these control lines is connected to a number of transducer elements, the number corresponding to the number of transducer elements of a group.

8 Claims, 6 Drawing Sheets

SWITCH MATRIX

BACKGROUND OF THE INVENTION

Figure 1:
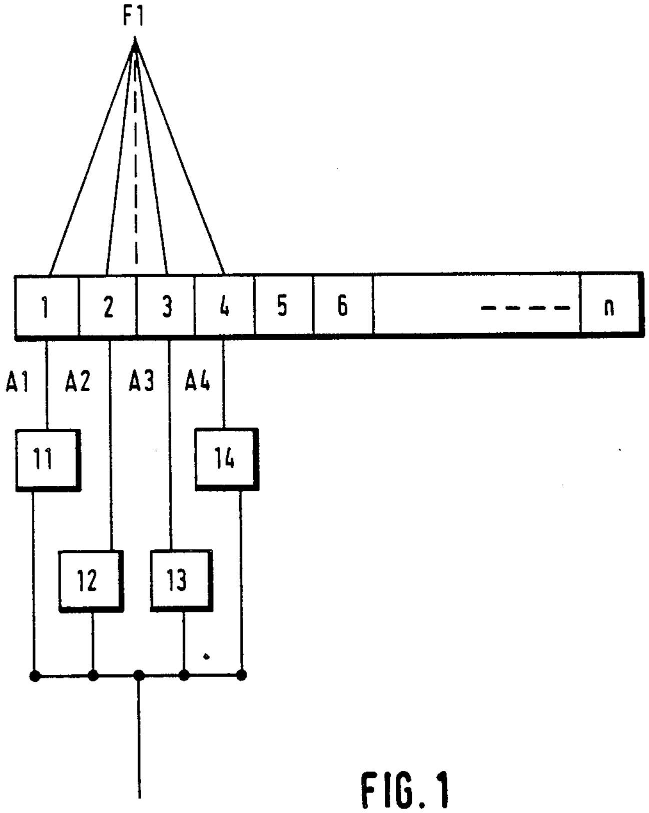

The invention relates to a switch matrix for a transceiver of ultrasonic waves for establishing electrical connections between the electroacoustic transducer elements of the group activated at a given time within a configuration of transducer elements and the delay elements for delaying the output signals of transducer elements derived from received ultrasonic signals or the oscillator signals transmitted to the transducer elements for the excitation of ultrasonic oscillations.

A switch matrix of this kind is used preferentially in transceivers in which through appropriate electronic activation of transducer elements arrranged in rows a focusing point can be produced. The individual transducer elements during transmitting or receiving are activated over differently set delay elements in such a way that the different distances of the transducer elements to the focusing point are compensated.

Thus, during transmission the ultrasonic waves are superimposed in phase in the focusing point while in the remaining sound field they obliterate each other. In order to scan as large an area as possible, for instance in the body of a patient and, in order to improve lateral resolution during different transmit/receive periods, different groups of adjacent transducer elements are activated each time. The elements are activated at any given time in such a way that for each group a separate focusing point results. When the group of activated transducer elements is shifted continuously each time by one transducer element, the focusing points moves on a line parallel to the transducer elements.

In order to be able to activate the individual transducer elements during shifting of the transducer element groups, each time with the delay necessary for the production of a focusing point, the established connections between the transducer elements and the delay elements have to be changed each time after each shift. To establish each of the necessary connections between transducer elements and delay elements, a great number of switches arranged in the manner usual in a switch matrix are necessary.

A switch matrix of the mentioned type is known from U.S. Pat. No. 3,919,683. The known switch matrix is used in a transceiver of ultrasonic waves in which six transducer elements are activated simultaneously each time. The delay times for the first and the sixth transducer element of a group, for the second and the fifth element as well as for the third and the fourth element are the same in each case so that the resulting focusing point is located on the midperpendicular to the transducer element group activated at any given time.

A selection circuit is connected to the transducer element configuration which has on the input side a large number of selection switches each connected to a transducer element and on the output side six output lines connected to the switch matrix. During the shift of the transducer element group by one transducer element, each of the selection switches connected to the first transducer element of the group activated during the preceding step is opened and the selection switch assigned to the last transducer element of the newly to be activated group closed. Thus, during each advancement of the transducer elements only two selection switches need to be operated. The echo signals received by the transducer elements are transmitted over the six output lines to the switch matrix which connects each of the output lines with the delay elements necessary for focusing. Because of the described manner of advancing of the transducer elements, the assignment of the output lines of the selection circuit to the different delay elements has to be changed with each step. To this end, the known switch matrix has 18 switches of which, at any given time, three each are connected on the input side with each one of the six output lines of the selection circuit and each six on the output side with each one of three different delay elements. The control circuit for operating the individual switches has a large number of logic circuits, as for instance NAND gates, and many other additional electronic components, like transistors, such that the result represents overall a high degree of circuit complexity. The complexity would, furthermore, be greatly increased if, in order to achieve higher resolution, the number of the transducer elements of a group would be raised.

Relative thereto it is an object of the present invention to create a switch matrix of the aforementioned kind which does not need such complicated control circuity.

BRIEF SUMMARY OF THE INVENTION

The invention is based on the recognition that through suitable choice of the number of switches and an appropriate grouping of these switches even with a much larger number of transducer elements of a group, a very clearly layed out switch matrix can be designed which can be operated using a considerably simpler control circuit.

According to the invention, the switches of the switch matrix are arranged in groups in such a way that each switch group has m switches, the number corresponding to the number of transducer elements of a transducer element group and that each switch group is connected on the input side each with one of the transducer elements of the transducer element group activated at a given time. Assuming continuous numbering of the switches of each switch group from 1 to m, each of the switches of same numbering of different switch groups on the output side is connected to the other and forms m outputs, the number corresponding to the number of elements of a group each of which is connected to the appropriate delay elements. The switch matrix according to the invention contains furthermore m control lines, the number corresponding to the number of transducer elements of a group, of which each is connected with m switches of the m different switch groups such that switches of each numbering are connected with each control line. During activation of each of the different groups of transducer elements, the control lines receive a control signal over each of the different control lines in such a way that the M switches connected to this control lines are closed and the remaining switches of the switch matrix are opened.

Since with the switch matrix according to the invention the required changes in the connection states during activation of a new transducer element group can be effected simply by sending each signal over a single control line connected to the control inputs of the switches, the control circuit can be designed very simply and especially does not need any logic gates or other electronic components for gating control signals. A significant advantage of the switch matrix according to the invention consists in its simple structure which allows ready application of the principle to any number M of transducer elements of a group. Because of its clear symmetrical structure, the switch matrix is especially simple to place on a semiconductor chip as integrated circuit.

The switches can be arranged in rows and columns of a square matrix such that a compact space-saving switch matrix results.

The number of output lines of the switch matrix can be reduced by half if the focusing point of the transducer element group activated at any given time lies on its midperpendicular.

Simple designs for the control circuit are possible. In accordance with them, the control circuit can be adjusted to any number of transducer elements of a group by adding for each additional transducer element an additional flip-flop.

The switch matrix not only can be used for processing incoming ultrasonic pulses but also for transmitting pulses for the generation of a focused output beam. To that end, the switch matrix has to be operated with the direction of the signal transmission reversed such that delayed oscillator signals for the excitation of the transducer elements are present at the output lines. If necessary, the sequence of steps followed during receiving operations, in which the different control signals are applied to the control lines, needs to be reversed.

Below, an embodiment of the invention is further explained with reference to the drawings.

Figure 2:
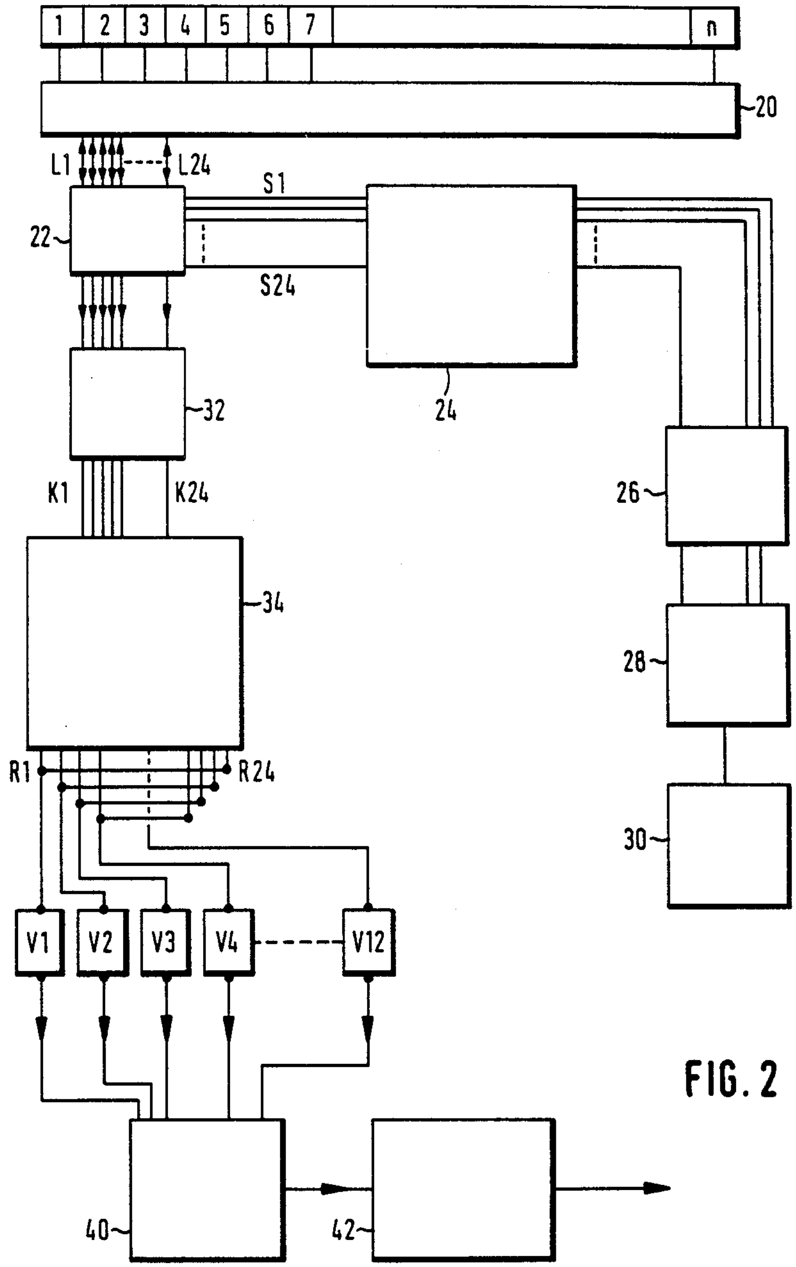
Figure 3A:
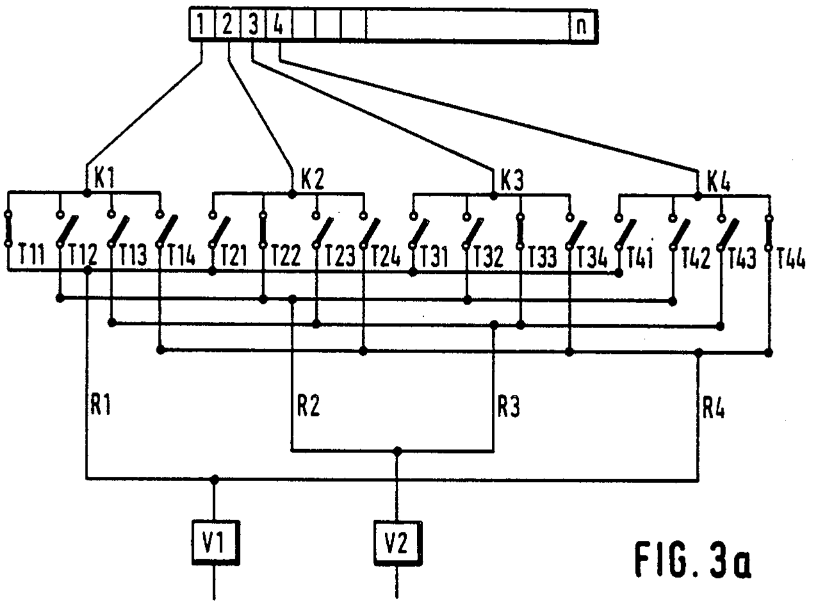
Figure 3B:
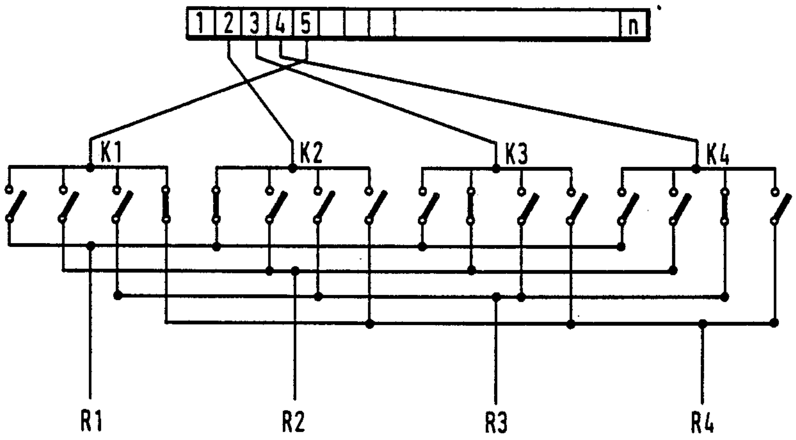
Figure 3C:
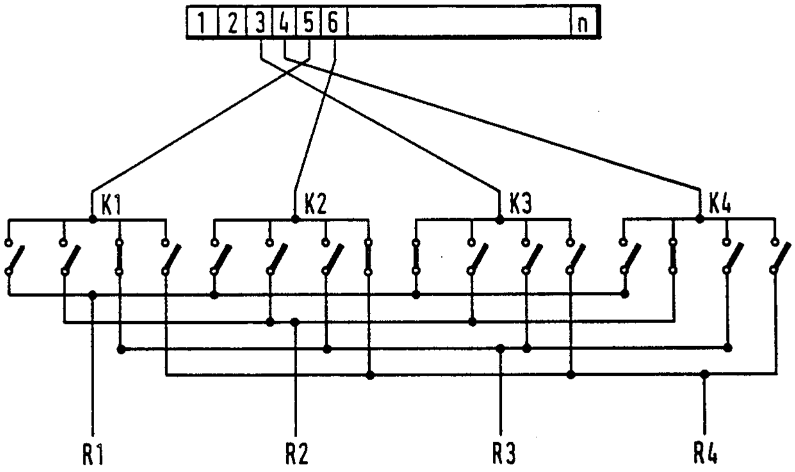
Figure 3D:
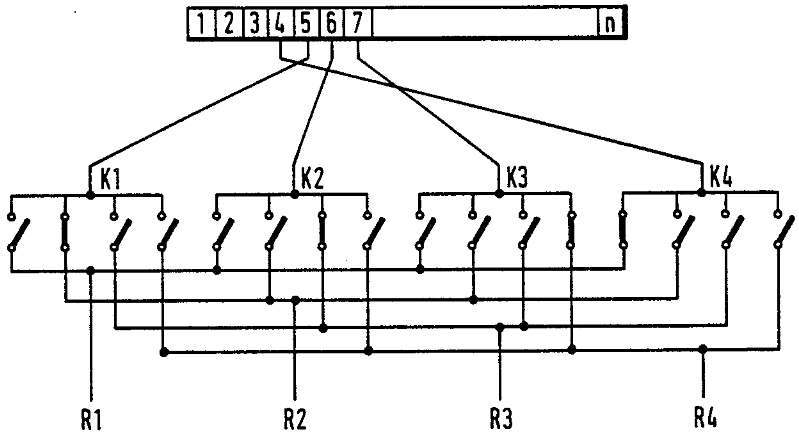
Figure 3E:
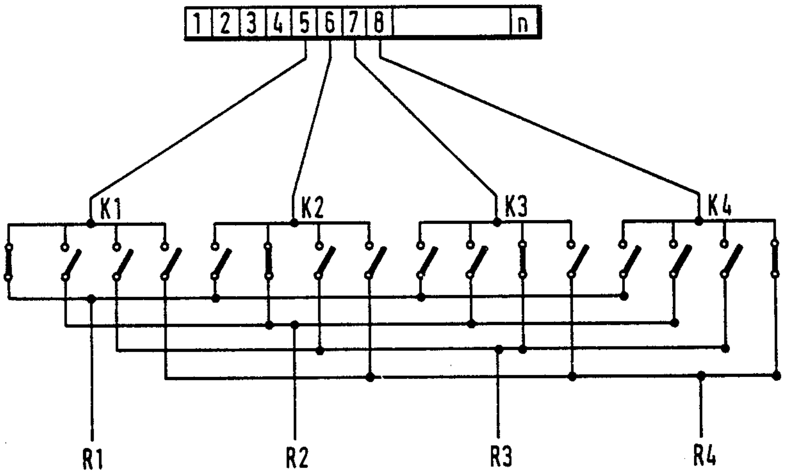
Figure 5:
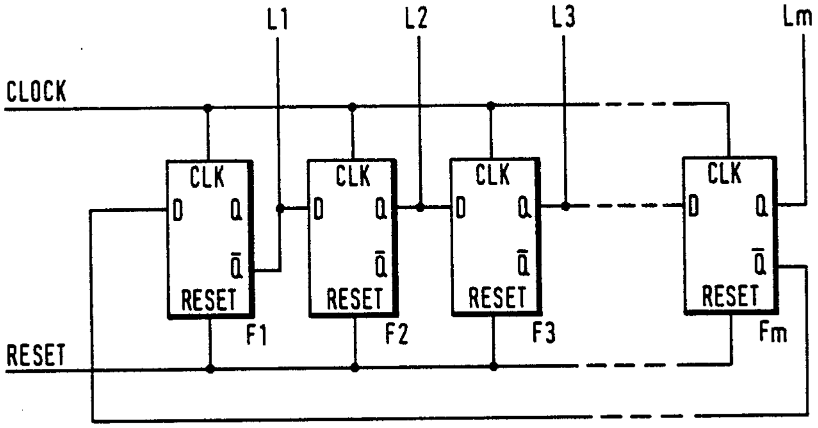
Figure 4:
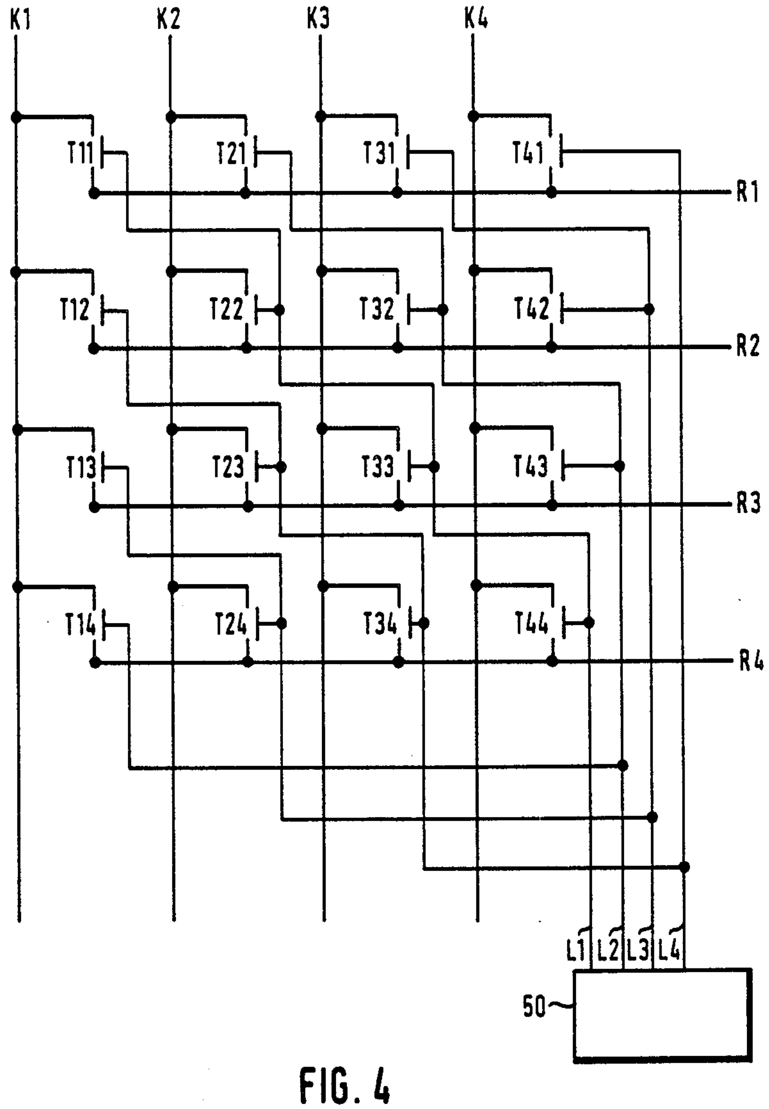

The drawings show:

FIG. 1: a schematic representation of a linear configuration of ultrasonic transducer elements and delay elements connected to them to elucidate the principle of electronic focusing, FIG. 2: a functional block diagram of a transceiver of ultrasonic waves in which the switch matrix according to the invention is used, FIGS. 3*a* to 3*e*: a scheme of the connection established in each of five successive steps through the switch matrix according to the invention between transducer elements and delay elements of a group of four simultaneously activated transducers elements, FIG. 4: a circuit diagram of the switch matrix in accordance with FIGS. 3*a* to 3*e* including control lines and control circuit, and FIG. 5: a control circuit for the switch matrix according to the invention.

In FIG. 1, the principle of electronic focusing is elucidated using a group of four at a given time simultaneously activated transducer elements. The group of simultaneously activated transducer elements is called aperture below. It should be understood, that the aperture can consist of any number of transducer elements whereby the lateral resolution of the ultrasonic image obtained increases with the number of transducer elements of the aperture.

The transducer elements 1, 2, 3, 4, 5, . . . , n, arranged in a row as shown in FIG. 1, are stimulated by excitation signals on lines A1, A2, A3 and A4 connected to the transducer elements to transmit ultrasonic pulses. The excitation signals are delayed with respect to each other via delay circuits 11, 12, 13 and 14 in such a way that the waves transmitted by the transducer elements 1, 2, 3 and 4 during a first transmit-receive period are superimposed upon each other in phase in a focusing point F1. Likewise, during reception of the ultrasonic signals reflected from a test object, focusing can be achieved by delaying each of the electric output signals of the transducer elements in such a way that the transit time differences of the ultrasonic signals coming from a focusing point F1 and being received by different transducer elements are compensated. During reception of the reflected ultrasonic signals, the depth of the focusing point, i.e. the perpendicular distance of the focusing point F1 from the linear configuration of the transducer elements can be varied continuously if, during the reception, the delay times track the echo. In this way, "dynamic focusing" can be achieved, i.e. a focusing point covering the entire explored depth range.

In the succeeding transmit/receive period the aperture is advanced progressively by one transducer element, so that elements 2 to 5 are activated while element 1 is no longer activated. In this new setting (not shown) elements 2 to 5 are each activated with the delay with which in the preceding transmit-receive period elements 1 to 4 were activated so that a new focusing results, displaced by one transducer element to the right.

In FIG. 2, a transceiver of ultrasonic waves is shown in which the switch matrix according to the invention is used. A number n of transducer elements 1, 2, 3, . . . , n is connected to a selection circuit 20 which connects the transducer elements activated during each different transmit-receive period with output lines L1, . . . , L24. The selection circuit 20 contains n selection switches, the number corresponding to the total number of transducer elements, each connected to a transducer element. In one embodiment of the invention, 128 transducer elements are provided of which 24 adjacent transducer elements are activated simultaneously during each tansmit-receive period. Correspondingly, in this embodiment 24 outputlines L1, . . . , L24 are connected to the selection line. A transmitter-receiver filter 22 permits to selectively direct transmit pulses from a transmitting branch 24, 26, 28, 30 to the transducer elements or to direct the output signals of the transducer elements derived from received echo signals to a receive branch for further signal processing.

The reception branch includes the following componentry: a circuit 32 connected to the transmit-receive switch 22 serves for preamplification and for time-varying amplification of the echo signals as a function of the time elapsed each time after the transmission of an ultrasonic pulse. Through continual adjustment of the amplification factor the dynamic range of the incoming signals is decreased and thus further processing of the signals simplified. The signals amplified in this manner are directed to the switch matrix 34 and are switched by the matrix to outputs, the number corresponding to the number of input lines. In the embodiment described, the 24 output lines R1, . . . , R24 are connected with each other in pairs, and, in particular, the first line R1 is connected to the last line R24, the second line R2 is connected to the penultimate R23, etc.

To each of these 12 outputs delay elements V1, V2, . . . , V12 are connected, the delay times of which are appropriately adjusted to each other, in order to achieve electronic focusing. To permit dynamic focusing, the delay times of the individual delay elements can additionally be regulated continuously or in small steps through a control device (not shown). The delay elements V1, . . . , V12 are connected to a summing circuit 40 for the derivation of a composite signal corresponding to the sum of the delayed signals. The composite signal is subsequently processed further in a circuit 42 and converted into a digital signal which is processed in additional circuits so that, in the end, an image can be generated, representing the explored object, for instance, the inside of the body of a patient.

The already mentioned transmitter branch includes a pulse generator 28, which, over a transmitter control 30, is stimulated to give off transmitter pulses at appropriate times. The transmitter pulses are carried to delay circuits 26 in which they are delayed in a manner appropriate for the production of a focusing point. The delayed transmitter signals are subsequently carried to a switch matrix 24 which establishes connections between their inputs and their outputs so that the transducer elements of each of the activated transducer element group are activated with the necessary delay. The switch matrix 24 in the transmitter branch has essentially the same structure as the switch matrix 34 in the receiver branch.

In FIGS. 3*a* to 3*e*, the progressive advancing of the aperture elements by groups is elucidated using five successive steps and each connection generated by the switch matrix 34 for an aperture consisting of four transducer elements. In the first step, as shown in FIG. 3*a*, the transducer elements 1, 2, 3 and 4 are each connected to one of four channels K1, K2, K3, K4. The connections between the transducer elements and the channels K1 to K4 are all established through the selection circuit 20. For the sake of clarity, they have been omitted here. The switch matrix 34 contains 16 switches T11, T12, . . . , T44 which on the output side are connected to each other according to a scheme explained below and four control lines (not shown) connected to the control inputs of the switches. The control lines are connected to a control circuit for operating the switches. The switches are arranged in four switch groups with four switches each whereby each of the switch groups is connected on the input side with another channel.

As shown in FIG. 3*a*, each of those switches of the switch matrix which have the same numbering in different switch groups, are connected on the output side with each other and form each a common output line. Thus, each one of the switches T11, T21, T31 and T41 occurring in first position in the switch groups is connected with the other three to form a common output line R1. Correspondly, the switches occurring in second, third or fourth place are connected with each other and each form output lines R2, R3 or R4. Numbering of the switches in a switch group could equally well go from right to left. Important is only that for each switch group the same numbering is chosen.

The output lines R1 and R4 as well as the output lines R2 and R3 are each connected with the other and each of the connected lines is connected to the delay elements V1 or V2. In this way, the delay times for the transducer elements 1 and 4 as well as for the transducer elements 2 and 3 are equally great so that a focusing point results which lies on the midperpendicular to the transducer element group. The connections of the outputs of the switch matrix to the delay elements described, apply also to the steps shown in FIGS. 3*b* to 3*e*. However, for the sake of clarity, they are not represented.

For apertures with a different number m of transducer elements, the switch matrix according to the invention has m switch groups each with m switches, the number corresponding to this number. Each of these switch groups is connected by one channel via the selection circuit with one of the transducer elements activated at a given time. Each of the m switches of different switch groups of equal numbering is on the output side connected with each other and form one of m output lines which in turn are connected to the appropriate delay elements.

In the next step, as shown in FIG. 3*b*, through the selection circuit the transducer element 5 instead of the element 1 is connected to channel K1 while the other connections are maintained. In this manner, the corresponding focusing point shifts by one transducer element to the right. In the succeeding steps as shown in FIGS. 3*c* to 3*e*, the group of activated transducer elements is shifted to the right each time by one element by generating a connection between the newly to be activated transducer element and that channel which in the preceding step was connected to the left most transducer element. This manner of advancing has the advantage, among others, that with each new step always only one single already existing connection between one transducer element and one channel is broken and only one single new connection needs to be established.

As indicated in FIGS. 3*a* to 3*e*, with each step at any given time only one switch of a switch group is closed and during each of the subsequent steps the switch lying to the immediate left of this switch is closed so that after four steps (FIG. 3*e*) the original switching (FIG. 3*a*) is again restored. The opening and closing of the switches can be visualized as the migration of each closed switch along a switch group whereby the closing of the last switch of a switch group is followed in the next step by the closing of the first switch in this group. The control inputs of each of the switches closed during a given step are each connected through one control line (not shown) with one another so that these switches can be operated together by one single control signal over this control line.

In FIG. 4, the switch matrix as shown in FIGS. 3*a* to 3*e* is shown as a square matrix with the associated control lines and with one control circuit 50. Each of the four switch groups each connected to one of the input channels K1, K2, K3, K4 are arranged in columns. The switches of identical numbering within the individual switch groups form the rows of the matrix which are each connected to one of the four output lines R1, R2, R3, R4. Each one of the four control lines L1, L2, L3, L4 is connected to the control inputs of four switches whereby each time switches from each row and from each columns are assigned to each control line. The control line L1 is connected to the control inputs of the four switches T11, T22, T33, T44 arranged along the main diagonal of the switch matrix, the control line L2 is connected to the control inputs of the three switches T21, T32, T43 lying along the first secondary diagonal and with the control input of switch T14 of the last secondary diagonal below the main diagonal, the control line L3 is connected to the control inputs of the two switches T31 and T42 of the second secondary diagonal above the main diagonal and with the control inputs of the two switches T13 and T24 of the penultimate secondary diagonal below the main diagonal and the control line L4 is connected to the control input of switch T41 of the third secondary diagonal above and with the control inputs of the three switches T12, T23, T34 of the last but two secondary diagonals below the main diagonal.

The control circuit 50 sends in succession with each new step over the control lines L1, L2, L3 and L4 and then again over L1 a control signal which has the effect that each of the switches connected to the control line is closed while the remaining switches are open. Thus, the switch states, illustrated in FIGS. 3*a* to 3*e*, result.

For any number m of aperture elements, the switch matrix according to the invention provides m*m switches, whereby the m input channels K1, K2, . . . , Km are each connected to the inputs of the switches of a column and the m output lines R1, R2, . . . , Rm are each connected to the outputs of the switches of a row. The control input of each switch is connected to one of m control lines L1, L2, L3, . . . , Lm in such a way that for each column all switches of this column are connected with a different control line and that for each row all switches of this row are connected with a different control line at a given time. This can, for instance, be achieved as shown in the switch matrix according to FIG. 4, in that each switch of two diagonals, which contain a total number of m switches are connected to each of one control line, i.e. the control inputs of the switches of the main diagonal are connected to the control line L1, the control inputs of the switches of the first, the control inputs of the switches of the first secondary diagonal above and the last secondary diagonal below the main diagonal are connected to a second control line L2, etc. In this case, the appropriate connections between input channels and outputs are established by transmitting over the control lines L1, L2, . . . , Lm one control signal each.

It is not a necessary characteristic of the present invention, that the switches are arranged geometrically in rows and columns. Important is solely the kind of electric connection of the switches with each other and with the control lines. Arranging the switches in rows and columns permits a simple circuit design and allows a clear description of the great number of electric connections in the switch matrix according to the invention.

Below, based on FIG. 5, an embodiment of the control circuit 50 for an aperture of m transducer elements is explained. The control circuit contains essentially a number of flip-flops F1, F2, . . . , Fm, the number corresponding to the number of transducer elements of a group, connected in series whose clock inputs CLK receive over line CLOCK a clock signal and whose reset inputs RST receive a reset signal over line RESET. The inverted output of the first flip-flop F1 is connected to the D input of the second flip-flop F2 and with the control line L1. The non-inverted output of the second flip-flop F2 is connected to the D input of the third flip-flop F3 and to the control line L2. Correspondingly, each of the non-inverted outputs of each succeeding flip-flop is connected to the D input of the following and with one control line. The inverted output of the last flip-flop Fm is connected to the D input of the first flip-flop F1 and the non-inverted output is connected to the control line Lm.

Thus, the control circuit can be expanded for greater apertures by simply adding an additional flip-flip for each additional aperture element.

The control signals on the control lines L1, L2, L3, L4, . . . are generated in the following manner: First all flip-flops are reset so that at the non-inverted output (Q) of each flip-flop a signal with the logic state "0" (low level) is present. As a consequence, from the inverted output ($\bar{Q}$) of the flip-flop F1 and thus over control line L1 a signal of logic state "1" (high level) is transmitted which has the effect that the switches assigned to this control line are shut while all of the remaining switches are open. With the next clock pulse the first flip-flop F1 receives a signal of state "1", since it is fed from the inverted output of the last flip-flop Fm. At the inverted output of the first flip-flop F1 thereupon a signal of state "0" is present, at the non-inverted output of the second flip-flop F2 a signal of state "1" and at the non-inverted output of each of the remaining flip-flops a signal of state "0". In the following clock cycles, a signal of state '1' is sent to each of the succeeding flip-flops in the row line so that in different clock cycles a signal '1' is present each time at a different control line. When the last flip-flop Fm in the row has received a signal of state "1" in the next step a signal of state "1" is again transmitted to the first flip-flop F1 so that the described process starts over again.

In stating that the switches are numbered no particular physical arrangement is necessarily implied. A different switch in each group is connected to the second set of lines such as R1, R2, R3 and R4 of FIGS. 3 (*a*–*e*), and the switches are closed so as to connect the second set of leads to the first, K1, K2, K3 and K4, in the same sequence but with the sequence starting at a different one of the second set of leads. The sequence goes from K4 to K1. Thus in FIGS. 3*a*, 3*b*, 3*c*, 3*d* and 3*e*, K1, K2, K3 and K4 are respectfully connected to R1, R2, R3, R4; R4, R1, R2, R3; R3, R4, R1, R2; R2, R3, R4, R1; and back to R1, R2, R3 and R4. The particular switch that is closed in a group determines which one of R1, R2, R3 or R4 the first set of leads K1, K2, K3 or K4 are to be connected.

The numbering of switches in each group previously referred to identifies the switch in each group that are connected together and to one of R1, R2, R3 or R4. As shown in FIG. 4, the switches can be physically located in accordance with the numbers. If the focal line is perpendicular to the mid-point of a group of transducers, the delays for pairs that are equally distant from the center are the same so that for example R1 and R4 are connected to V1 and R2 and R3 are connected to V2, but if the focal line is differently oriented, different delays could be provided for each of the switches. The delay sides of switches in each group that are to have the same delay are connected together, but a separate delay could be provided for each switch.

I claim:

1. A switch matrix for providing connections between respective delays and each of m consecutive activated transducers that advance along an array of transducers by activation of a transducer adjacent the m th transducer and the deactivation of the transducer at the other end of the m transducers, conprising:

m consecutive groups of m switches, each switch having a transducer side, a delay side and a control input, a first set of m leads respectively connected to the transducer sides of all the switches in each group, a second set of m leads respectively connected to the delay side of a different switch in each group, and m control lines, each control line being connected to the control input of only one switch in each group of switches, the delay sides of said switches being respectively connected to said second set of m leads in a given sequence, the sequence for the switches having their control input connected to different control leads starting at a switch in a different group.

2. A switch matrix as set forth in claim 1; wherein: the switches are arranged in m rows and m columns, the first set of m leads are respectively connected to the transducer sides of switches in a column, and the second set of m leads are respectively connected to the delay sides of switches in a row.

3. A switch matrix as set forth in claim 1, wherein:

a control circuit is provided for successively applying signals to said second set of leads so as to close the switches connected thereto, and delays are connected to the leads of said second set that are required to focus the m transducers when a signal is applied to one of said leads.

4. A switch matrix as set forth in claim 3, wherein said control circuit includes a shift register.

5. A switch matrix as set forth in claim 4 wherein like delays are supplied to pairs of leads of said second set.

6. Apparatus for respectfully coupling like delays to transducer elements at equal distances from the center of a group of m transducers of an array as the group is made to advance along the array comprising:

m groups of normally open switches, said groups respectively identified by numbers 1 through m, each of said groups of switches having m switches respectively and progressively identified by numbers 1 through m, buses identified by numbers 1 through m respectively connected to switches identified by the same numbers, a plurality of delays of different values, means for respectively connecting of said delays to said buses so that the delay for switches having numbers in the numerical center of the group is greater than the delays for switches having numbers farther from the numerical center of the group, means for respectively connecting said groups of switches to transducers of a group and for connecting the group of switches that is connected to an end one of said group of transducers to a transducer adjacent to the other end of said group of transducers in successive steps so that the group of transducers to which the groups of switches are connected advances along the array, and means for momentarily closing the switches in said groups in sequence starting with a different switch in each group, the sequence proceeding from a switch at one end of a group to a switch at the other.

7. Apparatus as set forth in claim 6 wherein said means for closing the switches is comprised of:

each of said switches having a control input and means responsive to a voltage applied to said input for closing the switch, m control lines respectively connected to the control inputs of different combinations of differently numbered switches in each group, and a shift register having outputs respectively coupled to said control lines.

8. Apparatus as set forth in claim 7 wherein said shift register is comprised of a series of flip flops.

* * * * *